United States Patent [19]
Wolthoff

[11] Patent Number: 5,214,944
[45] Date of Patent: Jun. 1, 1993

[54] ROD STABILIZER AND CLAMPING DEVICE

[76] Inventor: Charles E. Wolthoff, 378 Frances Pl., Wyckoff, N.J. 07481

[21] Appl. No.: 988,230

[22] Filed: Dec. 7, 1992

Related U.S. Application Data

[63] Continuation-in-part of Ser. No. 860,908, Mar. 31, 1992, abandoned.

[51] Int. Cl.⁵ .................... B62H 5/16; F16D 1/00
[52] U.S. Cl. ........................ 70/226; 188/32; 403/174; 403/178; 403/219
[58] Field of Search ............ 403/171, 170, 176, 174, 403/178, 219; 70/18, 19, 225, 226, 209, 237, 232, DIG. 57, 211, 212, 259, 260; 188/32

[56] References Cited

U.S. PATENT DOCUMENTS

| | | | |
|---|---|---|---|
| 967,308 | 8/1910 | Barr | 70/226 |
| 1,975,384 | 10/1934 | Ahlborn | 403/178 |
| 3,695,071 | 10/1972 | West | 70/18 X |
| 3,810,370 | 5/1974 | Jeppesen | 70/225 |
| 4,031,983 | 6/1977 | Lentini | 188/32 |
| 4,438,642 | 3/1984 | De Jong | 70/DIG. 57 X |
| 4,480,418 | 11/1984 | Ventrella | 403/171 X |
| 4,649,724 | 3/1987 | Raine | 70/226 |
| 4,651,849 | 3/1987 | Givati | 70/225 X |
| 4,854,144 | 8/1989 | Davis | 70/226 |
| 4,934,489 | 6/1990 | Jackson | 70/226 X |
| 5,013,176 | 5/1991 | Orbom | 403/171 |

FOREIGN PATENT DOCUMENTS

| | | | |
|---|---|---|---|
| 165388 | 4/1954 | Australia | 403/176 |
| 481753 | 8/1929 | Fed. Rep. of Germany | 403/176 |
| 2815243 | 10/1979 | Fed. Rep. of Germany | 403/170 |
| 2520683 | 8/1983 | France | 70/226 |
| 1176039 | 8/1985 | U.S.S.R. | 403/171 |
| 1392220 | 4/1988 | U.S.S.R. | 403/171 |
| 2070721 | 9/1981 | United Kingdom | 403/170 |
| 2150998 | 7/1985 | United Kingdom | 403/171 |

*Primary Examiner*—Lloyd A. Gall
*Attorney, Agent, or Firm*—Donald R. Heiner

[57] ABSTRACT

An apparatus for attachment over a hub of a vehicle wheel to prevent its rotation and prevent the wheel from being removed from its axle. The apparatus has a generally triangular shaped shell having an upper and lower triangular plate spaced apart by a series of vertical pins. The apexes of the triangular plates have openings formed therein for receiving one end of a hooked rod. The other ends of the hooked rods extend through the shell and are held in place by the vertical pins and a locking screw-threaded nut-sleeve locking assembly. The hooked ends of the rods engage the circumference or tread of the tires and are held firmly in place by tightening the locking screw against the rods. A padlock secured to the assembled device through the sleeve of the locking device prevents tampering with the apparatus when in place on a vehicle wheel.

14 Claims, 4 Drawing Sheets

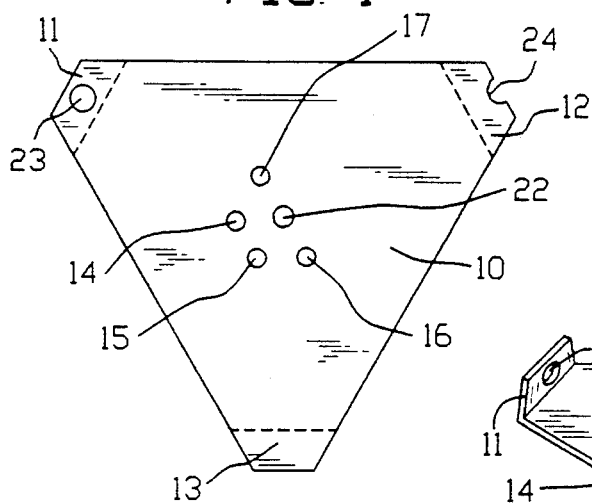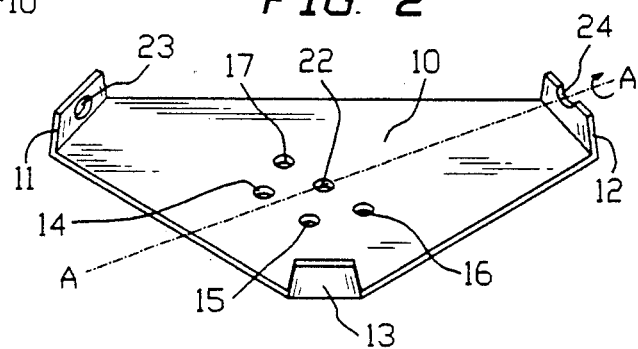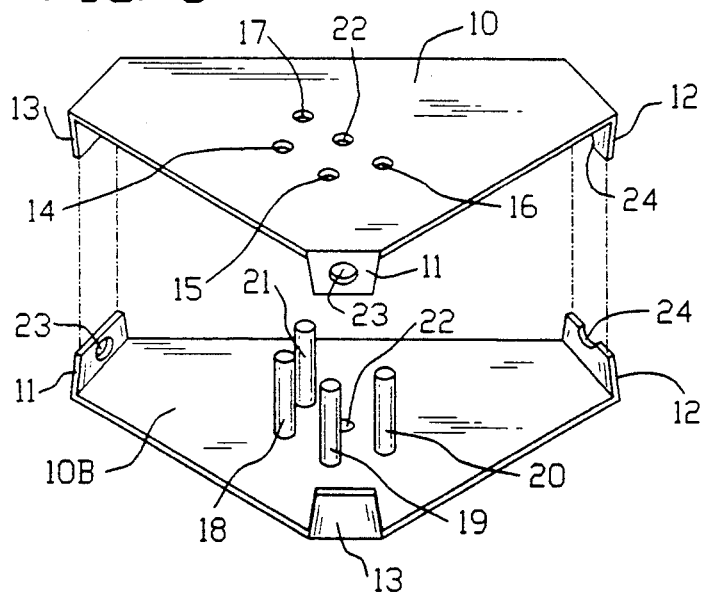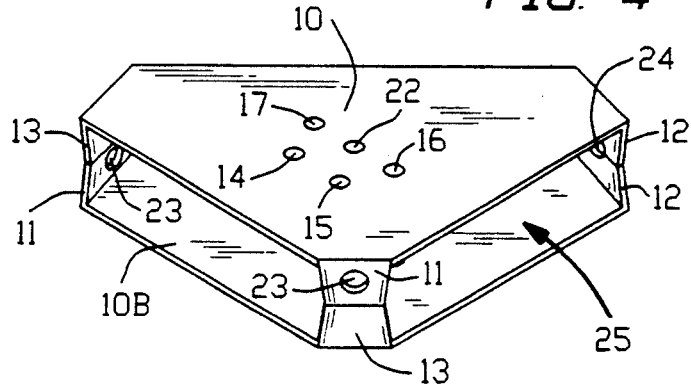

ROD STABILIZER AND CLAMPING DEVICE

CROSS REFERENCE TO RELATED APPLICATIONS

This application is a continuation in part of patent application Ser. No. 07/860,908 filed Mar. 31, 1992, now abandoned.

BACKGROUND OF INVENTION

1. Field of the Invention

The present invention generally involves the field of technology pertaining to a rod stabilizer and clamping device and more particularly to devices to be attached over the hub and hub cap of a vehicle wheel to prevent the wheel from being removed from the vehicle and making rotation of the wheel, with the device in place, difficult if not impossible. It is to be clearly understood that the use of the device as an anti rotation device on a vehicle wheel is for illustrative purpose only and for the purpose of describing a preferred embodiment of the invention and that such a rod stabilizer and clamping device has an unlimited number of uses. In general, the invention relates to a shell of any shape such as a circle, square, rectangle, etc. having a plurality of holes located around its periphery. The shell-like housing of the invention comprises rigid metal upper and lower plates having a plurality of pins centrally located in the shell-like housing. Rods are inserted into the holes, around the periphery of the shell-like housing, which rods are then guided by the centrally located pins such that the rods are positioned one above the other such that a clamping screw, which extends through the upper rigid metal plate, can be tightened to firmly clamp the rods tightly together at a generally central portion of the shell-like housing. More specifically, the invention relates to a combination of a generally triangular shaped shell having openings formed through the three apexes or tips of the triangle through which rods are inserted. One end of each rod is generally hook shaped for engagement with the outer circumference or tread or road engaging portion of a tire fitted to the vehicle wheel. The other end of each rod extends through openings between a top and bottom plate of the triangular shell. Disposed in the approximate mid portion of the triangular shell are a plurality of vertical pins extending between the top and bottom plate and which function to hold the rods in place in overlying and stacked engagement with each other. The vertical pins are held in place between the top and bottom plate of the shell in any well known manner. An opening is formed through the top plate of the shell, at the approximate mid point thereof, over which is fitted a threaded nut, secured to the top plate, for receiving a locking screw which, when rotated into the threaded nut causes a downward force to be applied to the uppermost rod which in turn causes a downward force on the rod below it and so forth to the rod below it holding them in locked engagement with each other and stabilizing the rods from rotation. A sleeve is attached to the top plate of the triangular shell, over the opening and around the threaded nut and locking screw. An opening is formed through the circumference of the sleeve for receiving the hasp portion of a padlock and thereby preventing the locking screw being rotated out of the threaded nut and thus disengaging the device from the wheel.

In a second embodiment of the invention the top and bottom plates of the shell have rod receiving channels formed therein thereby eliminating the need for the openings formed through the apexes of the first embodiment and further eliminating the need for the plurality of vertical pins extending between the top and bottom plate to separate and stabilize the rods relative to each other. The rods in this embodiment simply slide through the channels formed in the upper and lower plates and are otherwise secured in place through the locking screw, threaded nut, sleeve assembly of the first embodiment.

A need exists for such a device which is portable, easily assembled, light weight and provides an efficient and fool proof method of preventing the removal of a wheel from a vehicle and which makes its rotation difficult if not impossible.

2. Description of the Prior Act

In applicant's co-pending application the examiner has cited the following references as examples of other devices which protect against wheel removal or rotation: French Patent 2,520,683; West U.S. Pat. No. 3,695,071; Davis U.S. Pat. No. 4,854,144; DeJong U.S. Pat. No. 4,438,642; J.U. Barr U.S. Pat. No. 967,308; Givati U.S. Pat. No. 4,651,849; Jeppesen U.S. Pat. No. 3,810,370; Jackson U.S. Pat. No. 4,934,489; Lentini U.S. Pat. No. 4,031,983; and, Raine U.S. Pat. No. 4,649,724. None of this prior art was cited by the examiner against the claims of applicant's co-pending application.

The French Patent depends upon a pair of parallel telescopic bars disposed between two parallel vertically extending uprights or arms.

West U.S. Pat. No. 3,695,071 requires the use of triangularly shaped chocks welded to arms for engagement between the wheel and ground.

Davis U.S. Pat. No. 4,854,144 requires a pair of articulating arms interconnected with an adjustable arm and a complicated locking housing integral with a hub shield.

Givati U.S. Pat. No. 4,651,849 discloses two locking members pivotably connected by means of a sleeve and a locking device which locks these two members in an operable position on a tire.

Jeppesen U.S. Pat. No. 3,810,370 comprises a pair of identical arcuate plates having integral inwardly directed lips for engaging the inner sidewalls of a tire when the device is in place.

Raine U.S. Pat. No. 4,649,724 of necessity comprises a pair of chocks for abutting a rotating wheel at its ground contact point and wherein the chocks are interconnected by a pair of chock arms which in turn are locked to a stem by means of a lock.

The U.S. Pat. Nos. 967,308; 4,031,983; 4,438,642; and 4,934,489 to Barr, Lentini, DeJong and Jackson respectively are seen to be of more general interest.

SUMMARY OF THE INVENTION

According to the present invention a generally triangular shaped shell is provided to be attached over the hub of a rotatable wheel of a vehicle to prevent the wheel from being detached from the axle of the vehicle. Further, the wheel is prevented from rotation by means of a plurality of rods that extend through openings in the apexes of the triangular shaped shell and through the opening formed by spaced apart upper and lower plates of the triangular shaped shell. The rods have generally hooked shaped ends for engagement with the outer circumference or tread of a tire to prevent its rotation. The rods which extend through the triangular shell are stacked one over another and held in place, within the shell, by means of a plurality of vertically extending pins which extend between and separate the top and bottom plates. A locking screw, engaging a threaded nut, attached to the upper plate, is turned to engage the uppermost rod which in turn compresses the rods below it and thus prevent rotation or other movement of the rods after their hooked ends are placed over the tires threads. A padlock disposed through a sleeve disposed over the nut and locking screw assembly prevents access to the assembly and prevents disengagement of the device from the wheel-tire assembly.

In an alternate embodiment the vertical pins are eliminated, the openings in the apexes are eliminated, and channels are formed directly in the upper and lower plates of the shell for directly receiving the wheel engaging rods. The upper and lower plates are then attached to each other by any suitable and well known means. The device for locking the rods in place in this embodiment is the same as in the first embodiment.

It should be obvious that the shell and rods can be made from any suitable and durable material such as iron, steel, or any other metal or other material suitable for this purpose and that the shell can be of any suitable shape such as a square, rectangle, circle, triangle, etc. and that there can be any number of rod receiving holes around the periphery of the shell.

It is therefore an object of the present invention to provide a device to be fitted to a vehicle wheel to prevent its rotation.

It is another object of the invention to provide such a device to be fitted to a vehicle wheel to prevent its removal from the vehicle's axle.

It is a further object of the invention to provide a device to prevent a wheels removal and rotation having a triangular shaped shell for receiving a plurality of hooked shaped rods through openings formed through the apexes of such shell.

It is yet another object of the invention to provide such a device wherein the hook portion of such rods engage the road engaging surface of the wheel and tire.

It is yet another object of the invention to provide a device to be fitted to a vehicle wheel to prevent its rotation and removal from a vehicle axle wherein the device is a triangular shaped shell for receiving a plurality of hooked shaped rods through openings formed through the apexes of such shell and wherein the shell comprises a top and bottom plate, both generally triangular shaped, separated by a plurality of vertical pins through which the rods are fitted in a stacked engaging relationship with each other and wherein the rods are held in place by a locking mechanism comprising a locking screw engaging a threaded nut.

It is a further object of the invention to provide a device to prevent a wheels removal and rotation having a shell of any well known shape such as a square, rectangle, circle, etc. for receiving a plurality of hooked shaped rods through openings or holes formed through the periphery of such shell.

These and other objects, features and advantages of the invention shall become apparent from the following detailed description of a preferred embodiment thereof when taken in conjunction with the drawings wherein like reference characters refer to corresponding parts in the several views.

BRIEF DESCRIPTION OF THE DRAWINGS

FIG. 1 is a top view of one of the triangular plates of the triangular shell showing the rod receiving openings and openings for receiving the vertical pins and an opening for receiving the locking screw, locking nut assembly.

FIG. 2 is the same view as FIG. 1 but with the three apexes of the triangle rotated upwardly 90°.

FIG. 3 shows the plate of FIG. 2 in the bottom portion and the same plate rotated about axis A-A in the top portion such that the one and one half openings of FIGS. 1 and 2 become three openings when the two plates are assembled.

FIG. 4 is a pictorial view of the triangular shaped shell.

DETAILED DESCRIPTION OF THE PREFERRED EMBODIMENT

Figure 5:
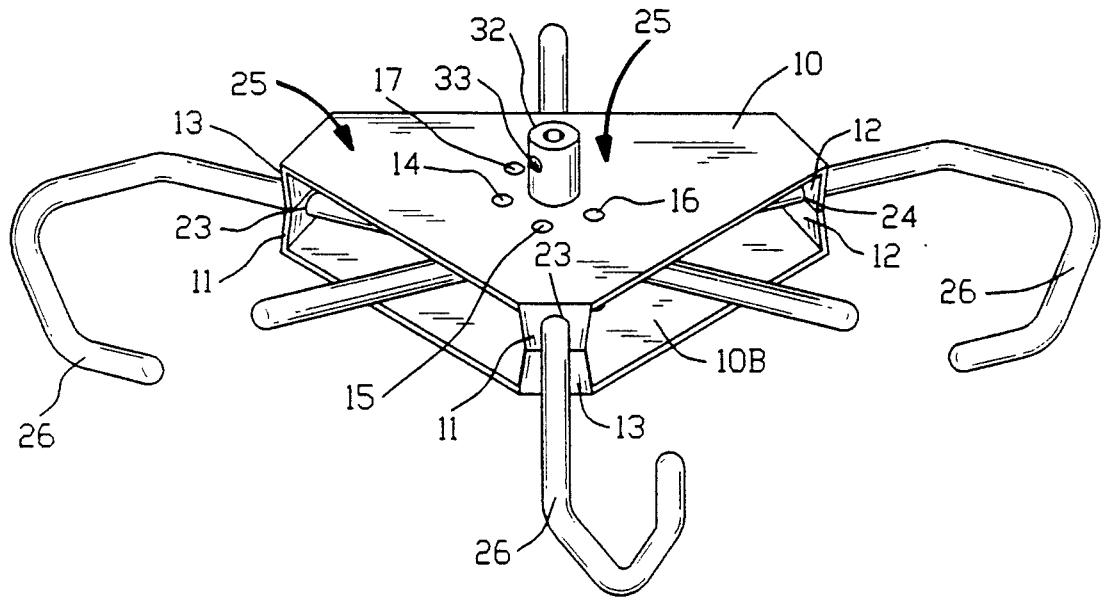
FIG. 5 is a pictorial view similar to FIG. 4 but showing the hooked rods and locking mechanism in place.

An anti-wheel rotation, anti-wheel removal device according to a preferred and an alternate embodiment of the invention will now be described with specific reference to the several views of the drawings. It is to be understood that the device is being shown associated with a wheel of a vehicle and as an anti rotation device but that such a rod stabilizer and clamping device can be used for any other suitable purpose In FIG. 1 there is shown a generally triangular shaped plate 10 having apexes 11, 12 and 13 and a plurality of pin receiving openings 14, 15, 16 and 17 therethrough for receiving vertical pins 18, 19, 20 and 21 shown in FIG. 3. The function of these pins 18-21 will be further described below. Another opening 22 in triangular plate 10 receives a locking screw 30 to be more fully described below.

FIG. 2 shows apexes 11, 12 and 13 bent 90° and at right angles to the plane of plate 10. A rod receiving opening 23 is formed through apex 11 and a one-half rod receiving opening 24 is formed through apex 12 for receiving hooked rods 26 to be more fully described below. When triangular plate 10 is rotated about axis A-A of FIG. 2 in the direction of the arrow shown in FIG. 2 it becomes the top triangular plate 10. For ease of description the bottom plate will be referred to as triangular shaped bottom plate 10B. Thus when the two plates 10 and 10B are rotated into the position shown in FIG. 3 and then meet as in FIG. 4 they form the generally triangular shaped shell 25 of the invention. The two triangular planes 10 and 10B are then joined together by any well known means such as by welding to yield the shell 25 as can best be seen in FIGS. 4, 5 and 8.

Figure 6:
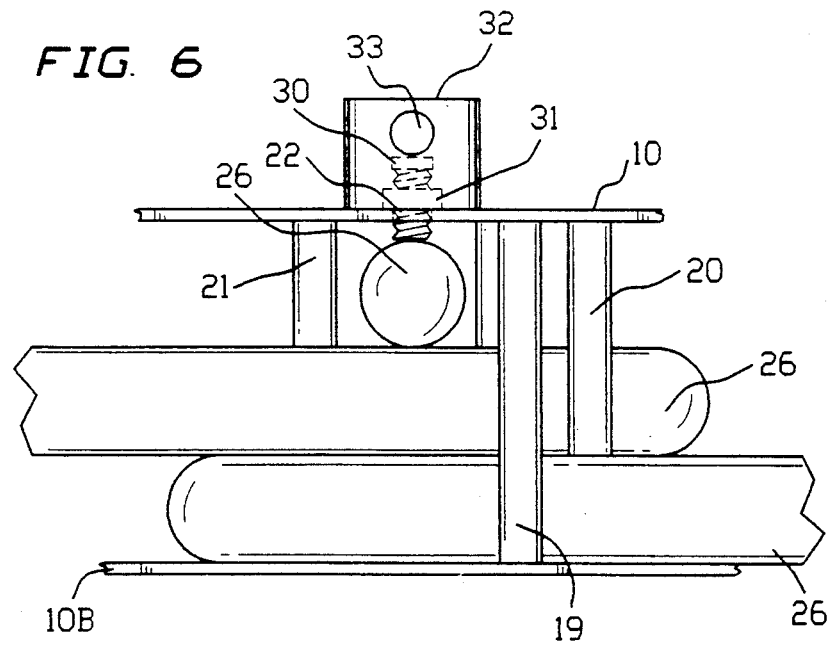
FIG. 6 is a side view of FIG. 5 showing the rods in place and the locking screw engaging the upper of the three rods.
Figure 6A:
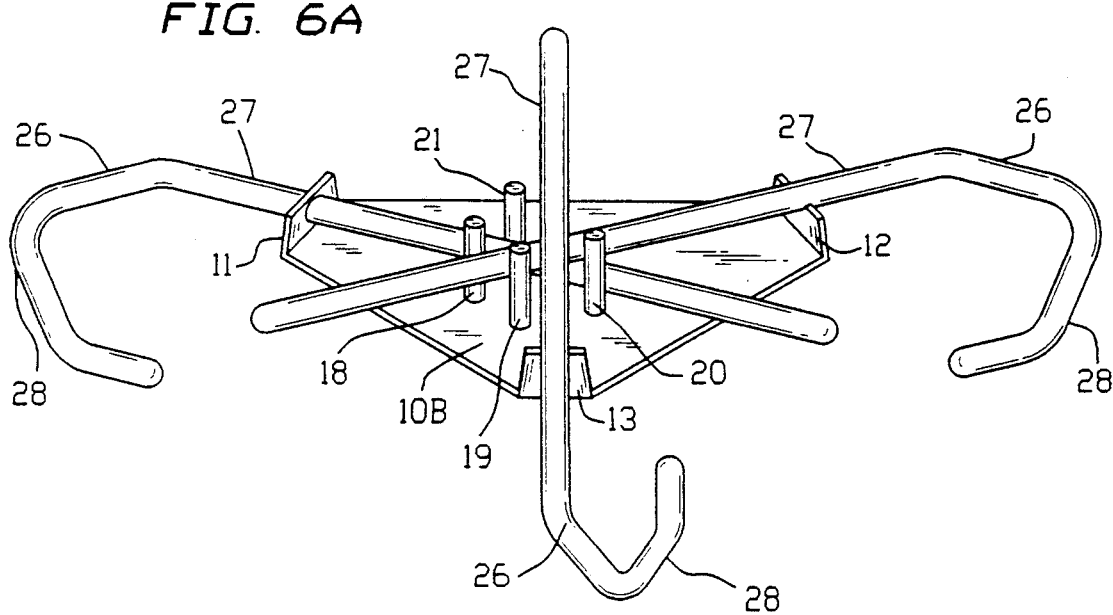
FIG. 6A. is a view similar to FIG. 5 but with the top plate removed and showing the vertical pins which separate the upper and lower plates and which position the hooked rods.
Figure 7:
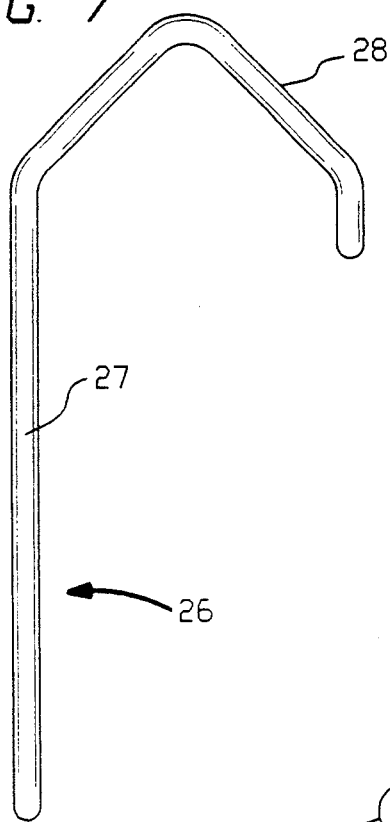
FIG. 7 is a view of one of the hooked rods.

Pins 18-21 are secured in openings 14-17 in any well known acceptable manner, such as by spot welding, and serve to receive and stabilize rods 26 against excessive lateral movement as can best be seen in FIG. 6A. Rods 26 have a straight shaft portion 27 and a hook portion 28 as best seen in FIG. 7

As best seen in FIGS. 5 and 6A rods 26 are inserted through rod receiving openings 23 and 24 in the upper and lower triangular plates 10 and 10B of the generally triangular shaped shell 25 with their straight shaft portions 27 extending into and through shell 25 in such a manner that they are stacked one on top of another and are substantially restrained against lateral movement by the pins 18–21. As seen in FIG. 6A each rod 26 is restrained by a pair of pins, one on each side of each rod. The positioning of the rod receiving openings 23 and 24 in the assembled shell 25 as shown in FIG. 4 allows the rods 26 to lay one over another in this stacked relationship. It is to be noted in FIGS. 4 and 5 that there is one rod receiving opening in the upper plate, one in the lower plate, and one at the mid point of the two plates when the two plates 10 and 10B are joined to form shell 25. This latter rod receiving opening is formed by the joining of the two one-half openings 24; one formed through each of the two plates 10 and 10B.

Figure 8:
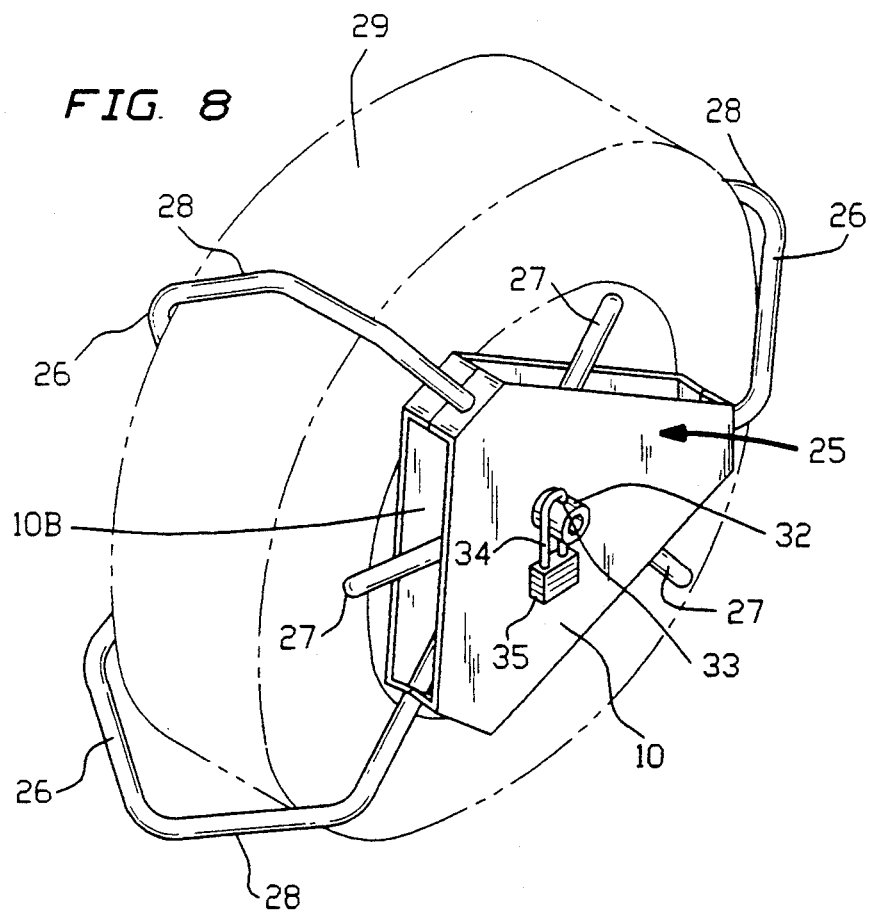
FIG. 8 shows the fully assembled device attached to a wheel in its operative position with the lock in place.

Hook portions 28 of rods 26 are configured to fit over the outer circumference or tread 29 of a vehicle tire as shown in FIG. 8 thereby making it difficult if not impossible to rotate the vehicle tire.

Referring now to FIG. 6 there is shown a locking screw 30 extending through opening 22 in plate 10 and threadably engaging nut 31. A sleeve 32 is attached to plate 10 over opening 22 and surrounding the locking screw-locking nut assembly. A lock receiving opening 33 is provided through the sleeve 32 as seen in FIGS. 5, 6, and 8 for receiving the hasp portion 34 of a lock 35 to prevent a tool from being inserted into sleeve 32 for the purpose of removing the locking screw 30 and thus disengaging the device from the wheel.

Figure 9:
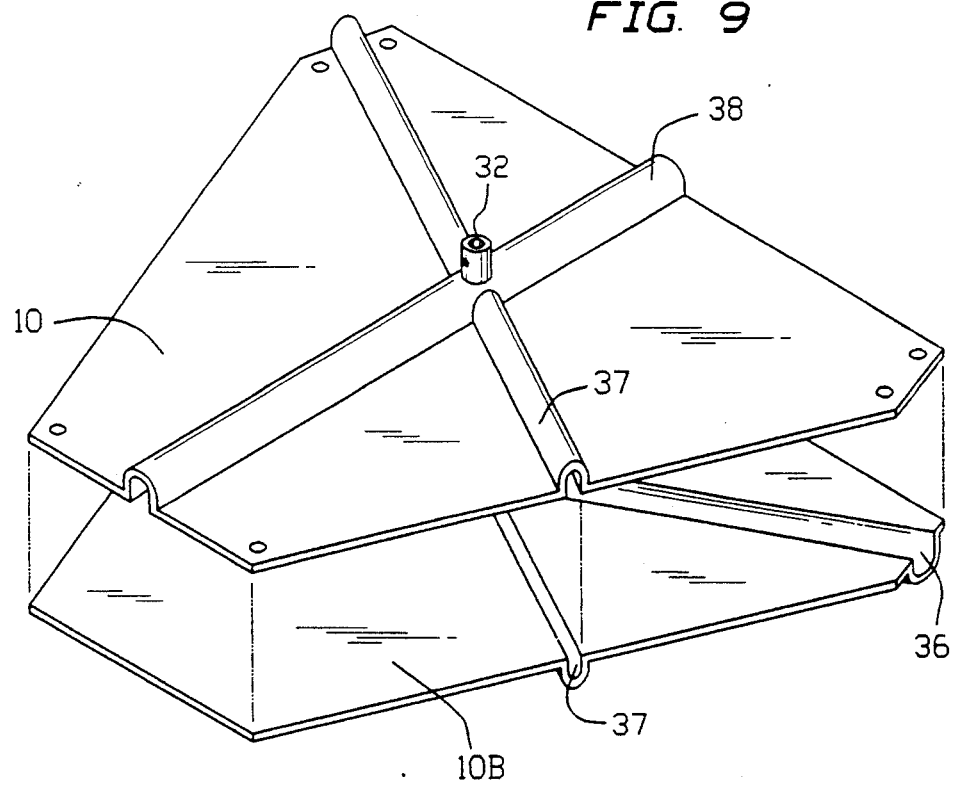
FIG. 9 is a pictorial view of the alternate embodiment showing the rod receiving channels and lock mechanism.

An alternate embodiment of the invention is shown in FIG. 9. This embodiment comprises the triangular shaped shell and rod receiving openings of the first embodiment but dispenses with the necessity of the vertical pins to separate the plates and stabilize the rods. The locking screw, locking nut, sleeve assembly are present as in the first embodiment described above. In this embodiment channels 36, 37, 38 are provided in plates 10 and 10B for slidably receiving the rods 26 of the first embodiment and as shown in FIG. 7. It is readily seen that the apexes of the triangular plates and the rod receiving openings formed therethrough and the vertical pins of the first embodiment are eliminated. The rods are inserted into the channels and the locking mechanism turned to secure the rods against movement as in the first embodiment.

It should be readily apparent that rods 26 can be of any convenient shape and not necessarily limited to the hook shaped rod of FIG. 7. It should also be apparent that with the use of straight rods numerous shells can be attached to one another and function as other than an anti-rotation device; such as forming a dome or any other structure.

In operation, the triangular shell is held in place over the wheel of a vehicle as in FIG. 8. The hooked ends 28 of rods 26 are then placed over the tire 29 as shown and the straight shaft portion 27 are inserted through the openings 23 and 24 of the apexes 11, 12 and 13 of the triangular shaped shell 25 and though the vertical pins 18–21 as seen in FIG. 6A, in a vertical, stacked relationship with each other with their contact point located under locking screw 30. The screw 30 is then rotated through nut 31 and into engagement with the upper most rod as viewed in FIG. 6 and 6A. As the locking screw 30 is tightened it exerts a force on the stacked rods thus keeping them securely held in place against rotation and lateral movement and thus securing the device in place. Lock 35 is then placed through sleeve 32 to prevent the untightening of the screw which would then allow the device to be readily removed.

Though the invention has been described and illustrated with reference to a preferred and an alternate embodiment thereof, those skilled in the art will appreciate that various changes and modifications in shape, size and composition and arrangement may be resorted to without departing from the spirit of the invention or scope of the subjoined claims. For example, the shell can be any well known shape such as, but not necessarily limited to, a circle, square, rectangle, etc. and there can be any number of rod receiving openings or holes about its periphery. The essence of the invention is to provide a shell of any shape having a plurality of rod receiving holes or openings in its periphery which rods are held in place, in a stacked relationship, and against lateral movement by a combination of centrally located pins attached to the upper and lower plates of the shell, and a clamping screw extending through the upper plate which is tightened to clamp the rods tightly together at a central portion of the housing.

What is claimed is:

1. A rod stabilizer and clamping device comprising upper and lower rigid metal plates defining a shell-like housing and including a plurality of pins attached at a central portion of the upper and lower plates, a plurality of holes located around a periphery of the shell-like housing, a plurality of rods being inserted into the holes and within the housing and guided by the plurality of pins such that the rods are positioned one above the other such that a clamping screw extending through the upper plate is tightened to clamp the rods tightly together at a central portion of the housing.

2. A rod stabilizer and clamping device as set forth in claim 1, wherein the rods include portion placed across the tread of a tire of a vehicle, to prevent the vehicle from being moved until the device is removed.

3. A rod stabilizer and clamping device as set forth in claim 1, wherein the housing is centered over a hub of a vehicle wheel to prevent removal of a hubcap, lug nuts and an axle wheel retaining nut, to prevent removal of the wheel.

4. A rod stabilizer and clamping device as set forth in claim 1, including a shield mounted on the housing and surrounding the clamping screw, the shield including holes to receive a lock to restrict access to the clamping screw.

5. A wheel rotation restraint device to be attached over the hub of a vehicle wheel to prevent the wheel from being removed from the vehicle and making rotation of the wheel difficult comprising:

(a) A generally triangular shaped shell;

(b) A plurality of rods extending through rod receiving openings in the apexes of said triangular shaped shell;

(c) A plurality of vertical pins disposed in said triangular shaped shell to receive and stabilize said rods against excessive lateral movement; and whereby said rods are held in a stacked one on top of the other relationship;

(d) A locking screw engaging a threaded nut attached to an upper surface of said shell whereby when said locking screw is rotated through said threaded nut it engages the uppermost of said rods which in turn compresses the rods below it thus preventing rotation or other movement of said rods; and, (e) Said rods further comprising a straight shaft portion for extending through said openings in said apexes and a hook portion to fit over the outer circumference or tread of said vehicle wheel when said device is in place over a vehicle wheel hub.

6. A device as claimed in claim 5, wherein said triangular shaped shell comprises a generally triangular shaped top plate and a generally triangular shaped bottom plate joined together at the apexes of each plate which are bent at an angle to the plane of each of said triangular plates.

7. A device as claimed in claim 6 wherein each of said generally triangular shaped plates has a total of one and one-half openings formed through their apexes whereby when the two plates are joined together to form said shell there are a total of three rod receiving openings formed therethough.

8. A device as claimed in claim 7 wherein there is a rod receiving opening in said top plate, a rod receiving opening in said bottom plate and a rod receiving opening at the mid-point of said top and said bottom plates where they are joined together at their bent apexes to form said shell.

9. A device as claimed in claim 8 wherein one of said plurality of rods is inserted through each of said rod receiving openings.

10. A device as claimed in claim 9 wherein said plurality of vertical pins are disposed between said top and said bottom plate and are disposed such that each of said rods is restrained by a pair of said pins; one on each side of each of said rods.

11. A device as claimed in claim 10 wherein a sleeve is attached to said top plate surrounding said locking screw and said threaded nut, said sleeve having a lock receiving opening therethrough for receiving a hasp portion of a lock to prevent a tool from being inserted into said sleeve for the purpose of removing said locking screw and thus disengaging the device from said wheel.

12. A wheel rotation restraint device to be attached over the hub of a vehicle wheel to prevent the wheel from being removed from the vehicle and making rotation of the wheel difficult comprising:

(a) A generally triangular shaped shell comprising a top plate and a bottom plate;

(b) A plurality of channels formed in said top and said bottom plate for slideably receiving a plurality of rods;

(c) Said rods further comprising a straight shaft portion for extending through said channels and a hook portion to fit over the outer circumference or tread of said vehicle wheel when said device is in place over a vehicle wheel hub;

(d) a locking screw engaging a threaded nut attached to an upper surface of said shell whereby when said locking screw is rotated through said threaded nut it engages the uppermost of said rods which in turn compress the rods below it thus preventing rotation or other movement of said rods; and (e) Each of said top and bottom plates has a total of one full channel and one half channel whereby when the plates are joined together to form said shell there are a total of three rod receiving channels formed therethrough.

13. A device as claimed in claim 12 wherein one of said rods is inserted through each of said channels.

14. A device as claimed in claim 13 wherein sa sleeve is attached to said top plate surrounding said locking screw and said threaded nut, said sleeve having a lock receiving opening therethrough for receiving a hasp portion of a lock to prevent a tool from being inserted into said sleeve for the purpose of removing said locking screw and thus disengaging the device from said wheel.

* * * * *